US009509985B2

(12) United States Patent
Maeda et al.

(10) Patent No.: US 9,509,985 B2
(45) Date of Patent: *Nov. 29, 2016

(54) IMAGE PROCESSING APPARATUS

(71) Applicant: Hitachi Maxell, Ltd., Osaka (JP)

(72) Inventors: Kazuhiro Maeda, Matsudo (JP); Takashi Kanemaru, Yokohama (JP); Hidenori Sakaniwa, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,725

(22) Filed: Mar. 10, 2015

(65) Prior Publication Data

US 2015/0189265 A1 Jul. 2, 2015

Related U.S. Application Data

(63) Continuation of application No. 12/915,875, filed on Oct. 29, 2010, now Pat. No. 8,988,496.

(30) Foreign Application Priority Data

Feb. 26, 2010 (JP) .................................. 2010-042459

(51) Int. Cl.
*H04N 13/04* (2006.01)

(52) U.S. Cl.
CPC ...... *H04N 13/0456* (2013.01); *H04N 13/0454* (2013.01); *H04N 13/0477* (2013.01); *H04N 13/0497* (2013.01)

(58) Field of Classification Search
None
See application file for complete search history.

(56) References Cited

U.S. PATENT DOCUMENTS

| 8,520,059 B2 | 8/2013 | Aoki |
| 2005/0248561 A1 | 11/2005 | Ito et al. |

(Continued)

FOREIGN PATENT DOCUMENTS

| CN | 101529475 A | 9/2009 |
| JP | 2007-286623 A | 11/2007 |
| WO | 2008/047270 A1 | 4/2008 |

OTHER PUBLICATIONS

Notice of Allowance U.S. Appl. No. 12/915,875 dated Nov. 13, 2014.

(Continued)

*Primary Examiner* — Kate Luo
(74) *Attorney, Agent, or Firm* — McDermott Will & Emery LLP

(57) ABSTRACT

In an image processing apparatus, images that can be comfortably viewed by a viewer with less eyestrain can be displayed on a display device. In the image processing apparatus in which a three-dimensional image and a two-dimensional image can be simultaneously displayed on a multi-screen, if the three-dimensional image and the two-dimensional image are simultaneously displayed on a display device, the three-dimensional image is converted into two dimensions, and is output to be displayed on the same screen in the same dimensions. Alternatively, in the image processing apparatus in which a three-dimensional image and a two-dimensional image can be simultaneously displayed on a multi-screen, if the three-dimensional image and the two-dimensional image are simultaneously displayed on a display device, the two-dimensional image is converted into three dimensions, and is output to be displayed on the same screen in the same dimensions.

4 Claims, 12 Drawing Sheets

(56) References Cited

U.S. PATENT DOCUMENTS

| | | |
|---|---|---|
| 2007/0127121 A1 | 6/2007 | Maximus et al. |
| 2007/0195082 A1 | 8/2007 | Takanashi et al. |
| 2007/0242068 A1 | 10/2007 | Han et al. |
| 2008/0030428 A1 | 2/2008 | Tomisawa et al. |
| 2008/0151043 A1 | 6/2008 | Lee |
| 2008/0240569 A1 | 10/2008 | Tonouchi |
| 2010/0091091 A1* | 4/2010 | Kim .................. H04N 13/0438 348/42 |
| 2010/0238366 A1 | 9/2010 | Chang et al. |

OTHER PUBLICATIONS

Final Office Action U.S. Appl. No. 12/915,875 dated Nov. 18, 2013.
Chinese Office Action issued in Chinese Application No. 201010528442.5 mailed Apr. 2, 2013.
Non-Final Office Action U.S. Appl. No. 12/915,875 dated Jul. 26, 2013.

* cited by examiner

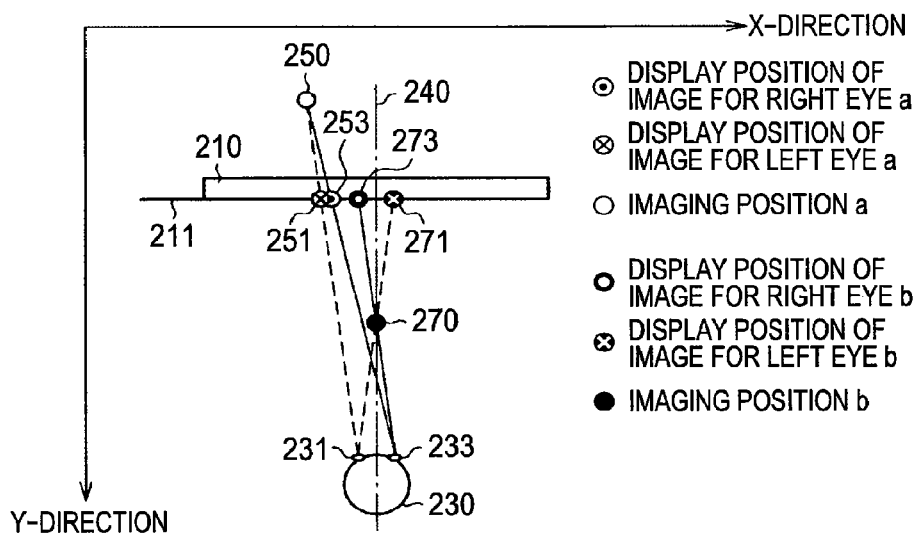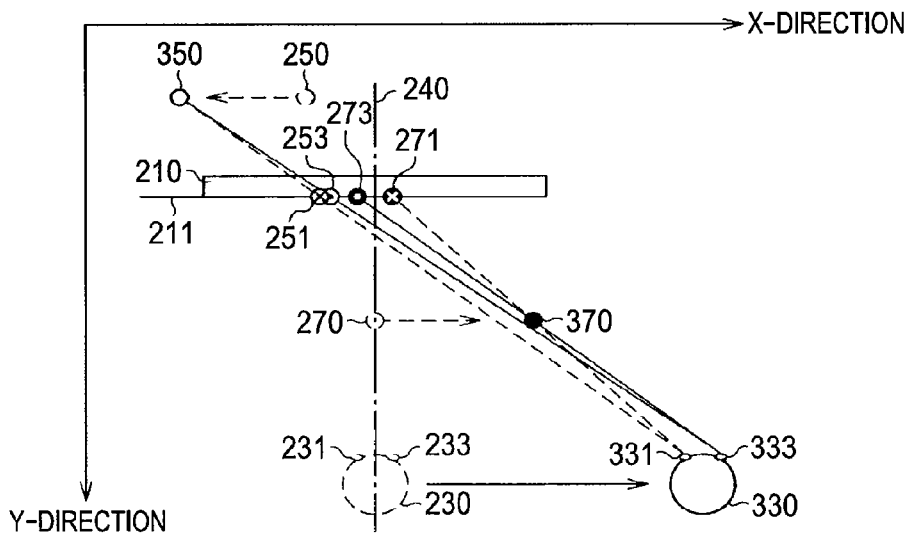

IMAGE PROCESSING APPARATUS

CLAIM TO PRIORITY

The present applications is a Continuation Application of U.S. Ser. No. 12/915,875 filed Oct. 29. 2010, which claims priority from Japanese patent application JP 2010-042459 filed on Feb. 26, 2010. The content of each is incorporated herein by reference in entirety.

BACKGROUND OF THE INVENTION (1) Field of the Invention

The present invention relates to a display device, and especially to an image processing apparatus by which one or both of three-dimensional images and two-dimensional images are simultaneously displayed.

(2) Description of the Related Art

As a technique for a viewer such a human to recognize a stereoscopic image among images displayed on a display device, a shift between images displayed on the left and right sides has been used from the past.

FIG. 1 is a perspective view for showing an outline configuration of a flat display device. The reference numeral 100 denotes a flat display device, the reference numeral 110 denotes a display panel screen, the reference numeral 120 denotes a bezel, the reference numeral 130 denotes aback cover, and the reference numeral 140 denotes the center line of the display panel screen 110 in the horizontal direction. The flat display device 100 is, for example, a television receiver which displays digital terrestrial broadcasting programs or videos (image) from a video recording/reproducing device.

In FIG. 1, a viewer views a displayed image in front of the display panel screen 110.

FIG. 2 is a diagram for explaining a conventional example in which an image is recognized as a three-dimensional image by using a shift between images viewed by the left and right eyes of a viewer. FIG. 2 is a diagram for explaining an imaging position between the left and right eyes in the case where a three-dimensional image is viewed from a correct viewing position. The reference numeral 210 denotes a display device, the reference numeral 211 denotes a display panel screen, the reference numeral 230 denotes a viewer, the reference numeral 231 denotes the left eye of the viewer 230, the reference numeral 233 denotes the right eye of the viewer 230, the reference numeral 250 denotes an image-forming position a, the reference numeral 251 denotes a display position of an image for the left eye a, the reference numeral 253 denotes a display position a of an image for the right eye a, the reference numeral 270 denotes an image-forming position b, the reference numeral 271 denotes a display position of an image for the left eye b, the reference numeral 273 denotes a display position of an image for the right eye b, and the reference numeral 240 denotes the center line in the stereoscopic view. FIG. 2 is a diagram in which the viewer 230 and the display device 210 are viewed from the above. In FIG. 2, the horizontal direction of the diagram represents the X-direction from the left to the right, and the vertical direction thereof represents the Y-direction from the back face to the front face. In FIG. 2, the center line in the stereoscopic view 240 corresponds to the center line (see the center line 140 of FIG. 1) of the display panel screen 211.

As shown in FIG. 2, the viewer views images located at different positions on the display panel screen 211 through the left eye 231 and the right eye 233. The viewer 230 recognizes as if an image a is present at the image-forming position a250 through the display position of an image for the left eye a251 viewed from the left eye 231 and the display position of an image for the right eye a253 viewed from the right eye 233. As similar to the above, the viewer 230 recognizes as if an image b is present at the image-forming position b270 through the display position of an image for the left eye b271 viewed from the left eye 231 and the display position of an image for the right eye b273 viewed from the right eye 233. Specifically, all of two-dimensional images are formed images on the display panel screen 211, whereas three-dimensional images are viewed as plural images with different image-forming positions. Accordingly, the viewer can recognize the images as three-dimensional images.

In this case, the both eyes (the center position between the left eye 231 and the right eye 233) of the viewer 230 are located at the position on the straight center line of the display device 210 in the stereoscopic view.

In general, when the viewer is located at a correct viewing position, a three-dimensional image is set to be displayed on the display panel screen 211, so that the stereoscopic image can be correctly viewed.

However, if the both eyes of the viewer 230 are located at positions largely apart from the center line in the stereoscopic view as shown in FIG. 3, an object is formed images at a position different from the proper position thereof, and the viewer 230 views unnatural three-dimensional images. As similar to FIG. 2, FIG. 3 is a diagram for explaining a conventional example in which an image is recognized as a three-dimensional image by using a shift between images viewed by the left and right eyes of a viewer. FIG. 3 is a diagram for explaining an image-forming position between the left and right eyes in the case where a three-dimensional image is viewed from an incorrect viewing position. In FIG. 3, the same reference numerals are given to the same constituent elements as those in FIG. 2, and the explanation thereof will not be repeated. The reference numeral 330 denotes a viewer, the reference numeral 331 denotes the left eye of the viewer 330, the reference numeral 333 denotes the right eye of the viewer 330, the reference numeral 350 denotes an image-forming position a', and the reference numeral 370 denotes an image-forming position b'.

In FIG. 3, the viewer 330 is located at a position apart from the center line in the stereoscopic view 240. Therefore, the distances from the left eye 331 to the image (position a251 and position b271) and from the right eye 333 to the image (position a253 and position b273) are different from those in the case where the viewer 330 is located on the center line in the stereoscopic view 240. Accordingly, the image-forming positions a'350 and b' 370 are shifted from the correct image formation positions a250 and b270, respectively. Thus, the viewer 330 views unnatural three-dimensional images.

SUMMARY OF THE INVENTION

As described in the related art shown in FIG. 3, if the viewer views the images from a position shifted from the center line in the stereoscopic view, the viewer views unnatural three-dimensional images.

Further, in recent years, a viewer selects a video input among a plurality of video sources such as a plurality of broadcasting programs on one display panel screen and views the same by means of multi-screen display in many cases.

In addition, if a plurality of three-dimensional images is displayed, the images have different center lines in the stereoscopic view. In this case, any or all of three-dimensional images are viewed as unnatural by the viewer.

Japanese Patent Application Laid-Open No. 2007-286623 describes that when a two-dimensional display mode is switched to a three-dimensional display mode and vice versa in a display system for displaying two-dimensional or three-dimensional images, the driving mode is changed before an image is displayed. However, a two-dimensional image and a three-dimensional image are not displayed on the same screen.

In view of the above-described problems, an object of the present invention is to provide an image processing apparatus in which a three-dimensional image and a two-dimensional image can be simultaneously displayed on a multi-screen and images that can be comfortably viewed by a viewer with less eyestrain can be displayed on a display device.

In the image processing apparatus of the present invention in which a three-dimensional image and a two-dimensional image can be simultaneously displayed on a multi-screen, if the three-dimensional image and the two-dimensional image are simultaneously displayed on a display device, the three-dimensional image is converted into two dimensions, and is output to be displayed on the same screen in the same dimensions.

Alternatively, in the image processing apparatus of the present invention in which a three-dimensional image and a two-dimensional image can be simultaneously displayed on a multi-screen, if the three-dimensional image and the two-dimensional image are simultaneously displayed on a display device, the two-dimensional image is converted into three dimensions, and is output to be displayed on the same screen in the same dimensions.

Specifically, an image processing apparatus according to the present invention includes: an image processing unit which inputs three-dimensional or two-dimensional video signals from a plurality of video signal sources to be output as images after a predetermined process is performed; a display position processing unit which outputs display position information for simultaneously displaying the input video signals on one screen; a superimposition processing unit which performs a superimposition process to display the respective images input from the image processing unit on a display panel screen of a display device on the basis of the display position information; and a controlling unit which controls the image processing unit, the display position processing unit, and the superimposition processing unit in accordance with the operation of a user, wherein an image for the left eye and an image for the right eye are alternately output as the three-dimensional images, and image data to be simultaneously displayed together with the two-dimensional images are output.

In the image processing apparatus according to the present invention, the three-dimensional image and the two-dimensional image are arranged and displayed by the superimposition processing unit in such a manner that the center of the two-dimensional image in the horizontal direction matches the center line of the three-dimensional image in the stereoscopic view.

Preferably, in the image processing apparatus according to the present invention, when a main screen and sub-screens are displayed on the display panel screen, the center line in the stereoscopic view is that of the three-dimensional image of the main screen in the stereoscopic view.

Preferably, in the image processing apparatus according to the present invention, the superimposition processing unit converts the three-dimensional image to be displayed on the display panel screen into two dimensions in accordance with the operation of the user.

Preferably, in the image processing apparatus according to the present invention, when the main screen is displayed in the middle of the display panel screen in accordance with the operation of the user, the superimposition processing unit reduces the sizes of the images of the sub-screens for display.

Preferably, in the image processing apparatus according to the present invention, the superimposition processing unit moves the image for the right eye inward by a predetermined distance in the case where the three-dimensional image is arranged at a left end of the display panel screen, and the image for the left eye inward by a predetermined distance in the case where the three-dimensional image is arranged at a right end of the display panel screen.

Preferably, in the image processing apparatus according to the present invention, the superimposition processing unit shifts the image inward and the image is displayed by enlarging the size thereof in the horizontal direction.

Preferably, in the image processing apparatus according to the present invention, the superimposition processing unit shifts the image inward and the image is displayed by reducing the size thereof in the horizontal direction.

Preferably, in the image processing apparatus according to the present invention, the superimposition processing unit changes the predetermined distance in accordance with the distance between the display panel screen and the user.

Preferably, in the image processing apparatus according to the present invention, if the three-dimensional image to be three-dimensionally displayed is present on the display panel screen, the superimposition processing unit changes the font of characters or symbols in the two-dimensional image to be displayed together with the three-dimensional image into a bold font or increases the size thereof by one level.

Preferably, in the image processing apparatus according to the present invention, the superimposition processing unit outputs the image for the left eye and the image for the right eye of the three-dimensional image on the display panel screen as the same image.

Preferably, in the image processing apparatus according to the present invention, the user can sterically view the three-dimensional images through shutter glasses or polarization glasses.

Preferably, in the image processing apparatus according to the present invention, the three-dimensional images and the two-dimensional images are arranged and displayed while being vertically aligned with the center line of the display panel screen in the horizontal direction.

According to the present invention, it is possible to provide an image processing apparatus in which images that can be comfortably viewed by a viewer with less eyestrain can be displayed on a display device.

BRIEF DESCRIPTION OF THE DRAWINGS

FIG. 2 is a diagram for explaining an image-forming position between the left and right eyes in the case where a three-dimensional image is viewed from a correct viewing position;

FIG. 3 is a diagram for explaining an image-forming position between the left and right eyes in the case where a three-dimensional image is viewed from an incorrect viewing position;

DETAILED DESCRIPTION OF THE EMBODIMENT

Figure 1:
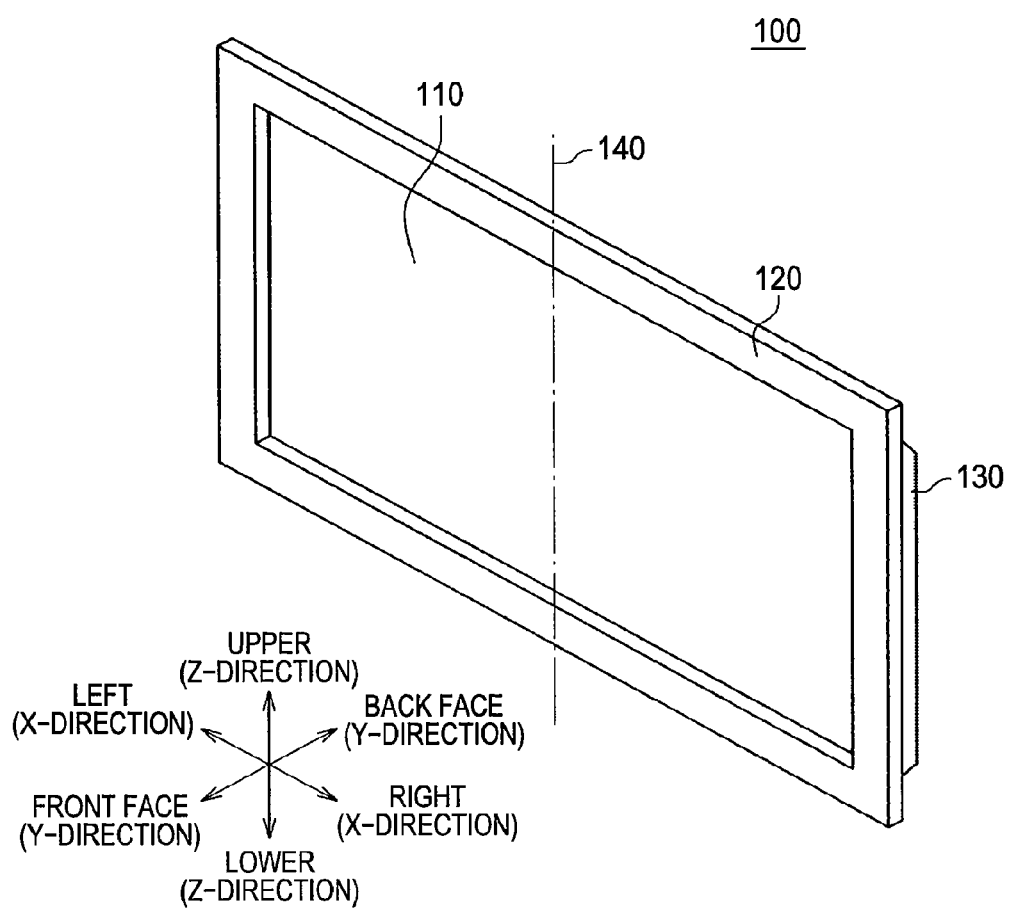
FIG. 1 is a perspective view for showing an outline configuration of a flat display device.

Hereinafter, preferred embodiments of the present invention will be described in detail using the accompanying drawings. It should be noted that the same reference numerals are given to constituent elements having the common functions in the respective drawings including FIG. 1 to FIG. 3 which have been already described, and the constituent elements which were once explained will not be explained again if the explanation for those is regarded as unnecessary.

Figure 4:
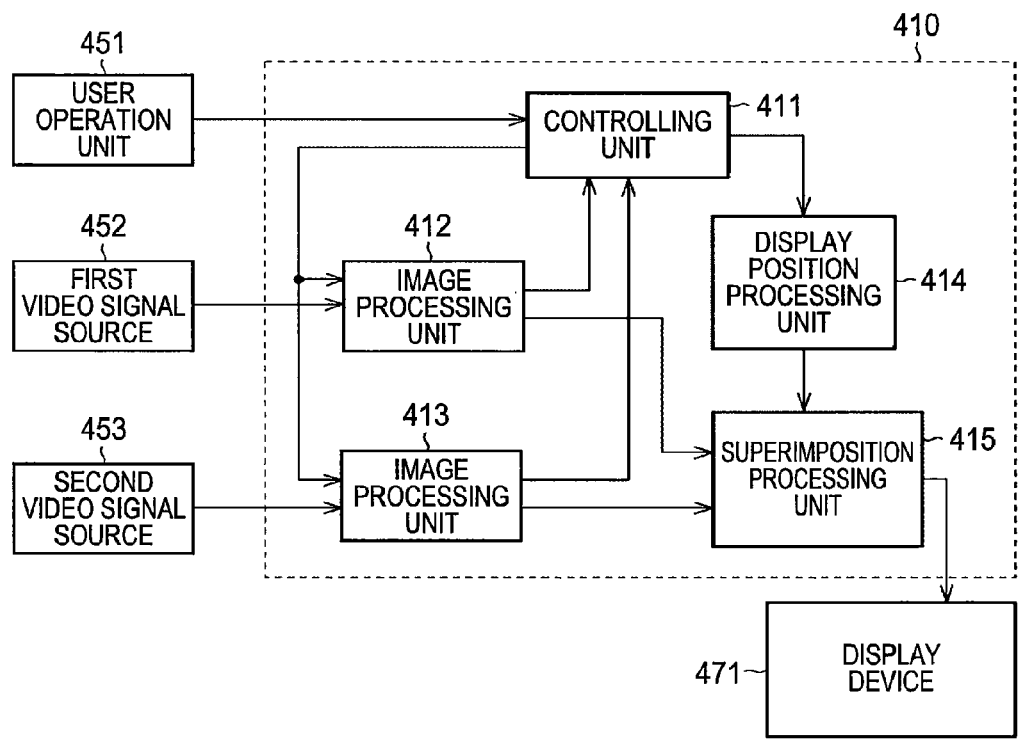
FIG. 4 is a block diagram for showing a configuration of an embodiment of an image processing apparatus according to the present invention.

A configuration of an image processing apparatus according to an embodiment of the present invention will be described using FIG. 4. FIG. 4 is a block diagram for showing a configuration of the embodiment of the image processing apparatus according to the present invention. The reference numeral 410 denotes an image processing apparatus, the reference numeral 451 denotes a user operation unit, the reference numeral 452 denotes a first video signal source, the reference numeral 453 denotes a second video signal source, and the reference numeral 471 denotes a display device. In the image processing apparatus 410 of the present invention, the reference numeral 411 denotes a controlling unit, the reference numerals 412 and 413 denote image processing units, the reference numeral 414 denotes a display position processing unit, and the reference numeral 415 denotes a superimposition processing unit. The image processing apparatus 410 is, for example, a video recording/reproducing apparatus having a TV tuner or a function thereof, or an STB (Set Top Box). Further, the first video signal source 452 and the second video signal source 453 are, for example, inputs of content by means of signal waves of digital terrestrial broadcasting programs through a TV antenna, those from a CATV station through a cable, those from a camera, those from an Internet browser, or those from a video reproducing apparatus. The number of video signal sources is not limited to two.

In FIG. 4, the controlling unit 411 mutually accesses the respective units of the image processing apparatus 410 in accordance with a software program that is a preliminarily stored as a processing operation of the image processing apparatus 410 under the control of the user operation unit 451, and controls the respective units of the image processing apparatus 410. Alternatively, the controlling unit 411 mutually accesses the respective units of the image processing apparatus 410 in accordance with a processing operation of an FPGA (Field Programmable Gate Array) unit that is preliminarily configured as a processing operation of the image processing apparatus 410 under the control of the user operation unit 451, and controls the respective units of the image processing apparatus 410.

The first video signal source 452 outputs a first video signal to the image processing unit 412. As similar to the above, the second video signal source 453 outputs a second video signal to the image processing unit 413. The image processing unit 412 outputs the input video to the superimposition processing unit 415 as a video in a system such as an SDTV (Standard Definition Tele-Vision) system or an HDTV (High Definition Tele-Vision). As similar to the above, the image processing unit 413 also outputs the input video to the superimposition processing unit 415 as a video in a system such an SDTV system or an HDTV system.

The display position processing unit 414 calculates positions where the image input from the first video signal source 452 and the image input from the second video signal source 453 are arranged on the display device under the control of the controlling unit 411, and outputs information of the calculated display positions to the superimposition processing unit 415.

The superimposition processing unit 415 superimposes the first video signal input through the image processing unit 412 on the second video signal input through the image processing unit 413 on the basis of the information of the display positions input from the display position processing unit 414, and outputs the resultant to the display device 471. It should be noted that the information of the display positions includes at least the sizes of the images and display positions.

Further, a process of converting a three-dimensional image input to the image processing apparatus 410 into two dimensions, or a process of using a three-dimensional image as it is may be performed by the superimposition processing unit 415 or the image processing units 412 and 413.

Figure 5:
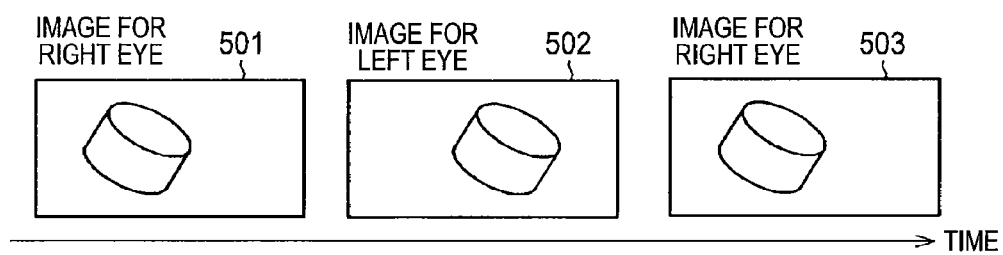
FIG. 5 is a pattern view for explaining output procedures of an image for the left eye and an image for the right eye in the case where three-dimensional images are output to a display device 471 and the horizontal axis represents a temporal axis.

A temporal order of images output from the image processing apparatus 410 will be described using FIG. 5. FIG. 5 is a pattern view for explaining output procedures in a frame sequential system in which an image for the left eye and an image for the right eye are alternately output when three-dimensional images are output to the display device 471. The horizontal axis represents a temporal axis.

The superimposition processing unit 415 deals with images for the left eye 501 and 503 input at a cycle of, for example, 60 [Hz] as image data of odd-numbered frames and an image for the right eye 502 as image data of an even-numbered frame, and outputs the data at the double speed (120 [Hz]) so as to be sequentially displayed on the display device 471. Alternatively, the superimposition processing unit 415 outputs the data at, for example, the quad speed so as to be sequentially displayed on the display device 471 while inserting a black image between the image data of an odd-numbered frame and the image data of an even-numbered frame. Insertion of the black image reduces flicker.

A viewer views the display device 471 with shutter glasses on. The shutter glasses allow the right eye of the viewer to view only the image for the right eye and the left eye of the viewer to view only the image for the left eye by alternately shutting the right and left shutter glasses in synchronization with switching of the image for the right eye and the image for the left eye displayed on the display device 471. The viewer can accordingly view the three-dimensional image. It should be noted that the present invention is not limited to the apparatus using the shutter glasses, but may be one using polarization glasses to view a three-dimensional image.

Figure 6:
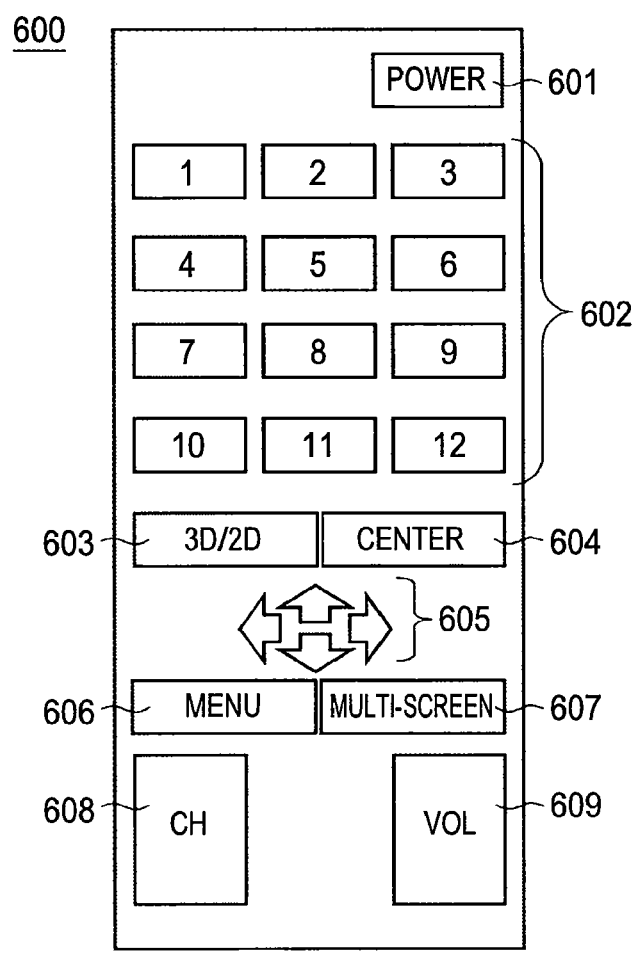
FIG. 6 is a diagram for showing an embodiment of an operation panel of the user operation unit 451 according to the present invention.

The user operation unit 451 of FIG. 1 will be described in detail using FIG. 6. FIG. 6 is a diagram for showing an embodiment of an operation panel of the user operation unit 451 according to the present invention. The reference numeral 600 denotes an operation panel, the reference numeral 601 denotes a power button, the reference numeral 602 denotes numeral keys functioning to input channel numbers 1 to 12, the reference numeral 603 denotes a 3D/2D switching button for switching between a three-dimensional image and a two-dimensional image, the reference numeral 604 denotes a CENTER button, the reference numeral 605 denotes cursor position moving buttons, the reference numeral 606 denotes a MENU button, the reference numeral 607 denotes a multi-screen switching button, the reference numeral 608 denotes a channel switching button, and the reference numeral 609 denotes a volume changing button. It should be noted that the channel numbers are those for, for example, TV programs.

For example, the viewer presses the respective buttons 602 to 609 to operate the operation panel 600. The content of the operation is transmitted to the controlling unit 411 of the image processing apparatus 410 by means of infrared communications or the like. Further, the controlling unit 411 operates the respective units of the image processing apparatus 410 so as to display a screen on the connected display device 471 in accordance with an operation result on the basis of the content of the operation.

Figure 7:
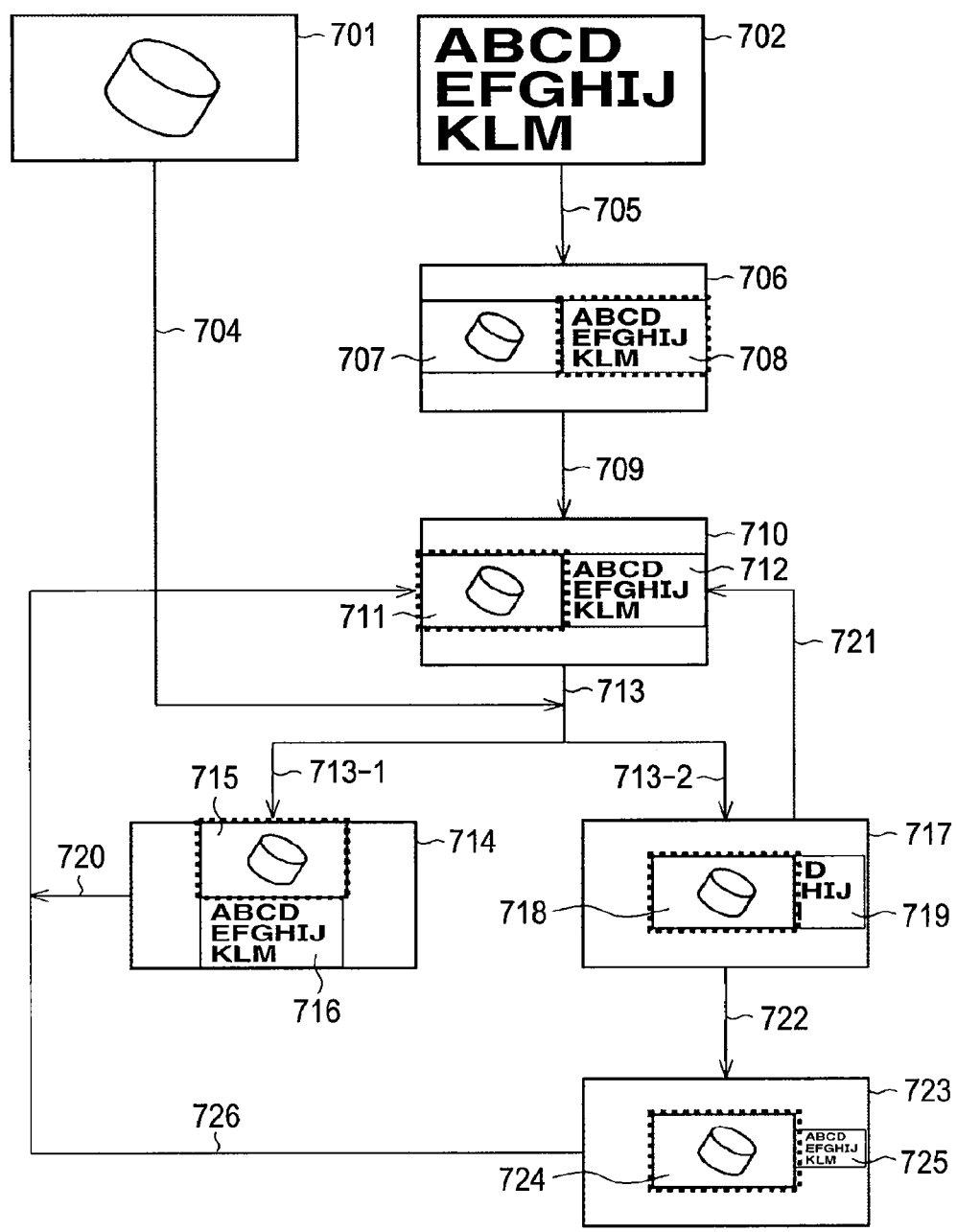
FIG. 7 is a diagram for explaining an embodiment of a switch display mode by the image processing apparatus of the present invention.

An embodiment of the operation of the image processing apparatus according to the present invention will be described using FIG. 7, FIG. 4, and FIG. 6. FIG. 7 shows screens displayed on the display device, and is a diagram for explaining the embodiment of a switch display mode by the image processing apparatus of the present invention. In the following description, the controlling unit 411 executes the processes unless otherwise specified.

In FIG. 7, a three-dimensional image 701 is displayed on the screen of the display device 471. At this time, both channels (both images for the right eye and the left eye) are displayed in the image 701, and the user can view the three-dimensional image. If the multi-screen switching button 607 is pressed in the display state, the display is switched to an image 714 or an image 717 through an arrow 713, and an arrow 713-1 or an arrow 713-2 as indicated by an arrow 704.

Further, if the multi-screen switching button 607 is pressed when a two-dimensional image 702 is displayed on the screen of the display device 471, the display is switched to an image 706 (two-dimensional display mode (1)) as indicated by an arrow 705. In this case, it is assumed that an image 707 is displayed on the left side by selecting a program of the three-dimensional image 701 when the multi-screen switching button 607 is previously pressed.

The three-dimensional image 707 is displayed on the left side of the image 706 and a two-dimensional image 708 is displayed on the right side thereof. The image 707 is displayed by reducing the size of the image 701, and the image 708 is displayed by reducing the size of the image 702. The sizes of the both images are reduced so as to be displayed on the whole screen with the same aspect ratio.

Further, only one channel (either one of the image for the left eye and the image for the right eye) is displayed in the three-dimensional image 707. Thus, the both images on the image 706 are displayed as two-dimensional images.

As a result, if the three-dimensional image and the two-dimensional image are mixed, eyestrain of the viewer can be suppressed.

In the image 706, the frame of the two-dimensional image 708 is displayed with a decoration from the beginning.

If the viewer operates the user operation device (operation panel 600) in this state to move the cursor to the left with the cursor position moving buttons 605, the display is switched to an image 710 (two-dimensional display mode (2)) as indicated by an arrow 709.

Specifically, the frame of an image 711 is displayed with a decoration. It should be noted that the term "displayed with a decoration" in the specification means eye-catching display such as coloring the frame of the image, thickening the frame line, flashing the frame line, or displaying an icon near the image, so that the viewer can distinguish the image from another.

As indicated by the arrow 713 and the arrow 713-1, the display is automatically switched to the preliminarily-set arrow direction after a predetermined time passes, or is switched to the image 714 (three-dimensional/two-dimensional display mode (1)) by the user operation of the viewer (pressing of the CENTER button 604).

Alternatively, as indicated by the arrow 713 and the arrow 713-2, the display is automatically switched to the preliminarily-set arrow direction after a predetermined time passes, or is switched to the image 717 (three-dimensional/two-dimensional display mode (2)) by the user operation of the viewer (pressing of the 3D/2D switching button 603).

In the display state of the image 714, an image 715 is switched from one channel display (image 711) to both-channel display, and is displayed as a three-dimensional image. In addition, the three-dimensional image 715 and a two-dimensional image 716 are arranged and displayed so as to be aligned in the vertical direction (upper and lower direction) at the center of the image 714 in the horizontal direction. In a preferred manner, the center of the two-dimensional image in the horizontal direction is arranged so as to match the center line of the three-dimensional image 715 in the stereoscopic view. In another preferred manner, the frame of the three-dimensional image 715 is displayed with a decoration. For example, the term "match" means a shift length corresponding to an individual difference of the distance between the left and right eyes of the viewer.

In the display state, the display is switched to the display mode (two-dimensional display mode (2)) of the image 710 by the user operation of the viewer (pressing of the 3D/2D switching button 603) as indicated by the arrow 720.

Further, in the display state of the image 717, an image 718 is switched from one channel display to both-channel display, and is displayed as a three-dimensional image. In addition, the display position of a two-dimensional image 719 stays the same as that in the image 710, the two-dimensional image 719 partially overlaps with the three-dimensional image 718, and the three-dimensional image 718 is arranged ahead of the image 719 in the middle of the screen. In a preferred manner, the center line of the three-dimensional image 718 in the stereoscopic view is arranged so as to match the center of the image 717 in the horizontal direction. For example, the term "match" means a shift length corresponding to an individual difference of the distance between the left and right eyes of the viewer. In another preferred manner, the frame of the three-dimensional image 718 is displayed with a decoration in the image 717.

In the display state, the display is switched to the display mode (two-dimensional display mode (2)) of the image 710 by the user operation of the viewer (pressing of the 3D/2D switching button 603) as indicated by an arrow 721.

In the display state of the image 717, the display is automatically switched to the preliminarily-set arrow direction after a predetermined time passes, or is switched to an image 723 (three-dimensional/two-dimensional display mode (3)) by the user operation of the viewer (pressing of the lower button of the cursor position moving buttons 605) as indicated by an arrow 722.

The display state is realized in such a manner that the size of the two-dimensional image 719 that hides behind the three-dimensional image 718 and cannot be viewed is reduced to be displayed as an image 725, and the image 725 can be viewed without changing the arrangement of an image 724.

As a result, the whole image of the two-dimensional image 725 can be viewed in addition to the three-dimensional image 724 in which both channels are displayed.

In the display state, the display is switched to the display mode (two-dimensional display mode (2)) of the image 710 by the user operation of the viewer (pressing of the 3D/2D switching button 603) as indicated by an arrow 726.

Figure 8:
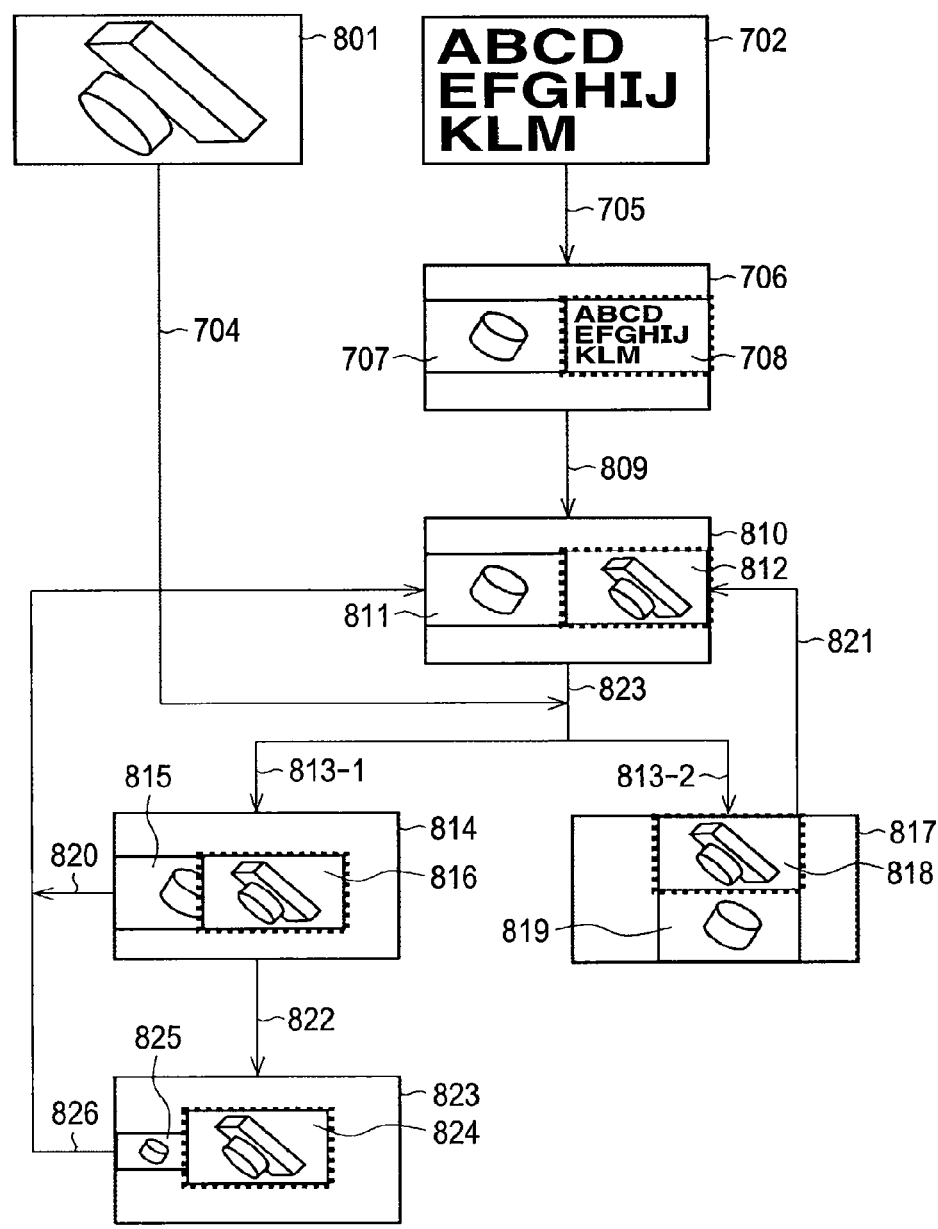
FIG. 8 is a diagram for explaining an embodiment of a switch display mode by the image processing apparatus of the present invention.

An embodiment of the operation of the image processing apparatus according to the present invention will be described using FIG. 8, FIG. 4, and FIG. 6. FIG. 8 shows screens displayed on the display device, and is a diagram for explaining the embodiment of a switch display mode by the image processing apparatus of the present invention. In the following description, the controlling unit 411 executes the processes unless otherwise specified.

In FIG. 8, a three-dimensional image 801 is displayed on the screen of the display device 471. The image 801 is preferably different from the image 701 in FIG. 7. If the multi-screen switching button 607 is pressed in the display state, the display is switched to an image 814 or an image 817 through an arrow 813, and an arrow 813-1 or an arrow 813-2 as indicated by an arrow 704.

Further, the two-dimensional images 702 to 708 are the same as those in FIG. 7, and thus the explanation thereof will not be repeated.

In the display state, if the viewer operates the numeral keys 602 or the channel switching button 608 of the user operation device 600 to select a channel of a three-dimensional video program (for example, the three-dimensional image 801 is selected), the display is switched to an image 810 (two-dimensional display mode (3)) as indicated by an arrow 809.

A three-dimensional image 811 is the same as the three-dimensional image 707, only one channel of the three-dimensional image is displayed. In a three-dimensional image 812, only one channel of the three-dimensional image 801 is displayed. These two images are displayed while being resized so as to be fitted on the screen 810. Further, the frame of the image 812 is displayed with a decoration. It should be noted that the image to be displayed with a decoration is changed by switching the selection by the user operation of the viewer (pressing of the right button or the left button of the cursor position moving buttons 605).

As indicated by the arrow 813 and the arrow 813-1, the display is automatically switched to the preliminarily-set arrow direction after a predetermined time passes, or is switched to the image 814 (three-dimensional/two-dimensional display mode (4)) by the user operation of the viewer (pressing of the CENTER button 604).

Alternatively, as indicated by the arrow 813 and the arrow 813-2, the display is automatically switched to the preliminarily-set arrow direction after a predetermined time passes, or is switched to the image 817 (three-dimensional display mode (1)) by the user operation of the viewer (pressing of the 3D/2D switching button 603).

In the display sate of the image 814, the display position of an image 815 in which only one channel of the three-dimensional image is displayed stays the same as that of the image 811, the image 815 partially overlaps with an image 816, and the three-dimensional image 816 is arranged ahead of the image 815 in the middle of the screen. The image 812 in which only one channel of the three-dimensional image is displayed is changed to the three-dimensional image 816 in which both channels are displayed. In a preferred manner, the center line of the three-dimensional image 816 in the stereoscopic view is arranged so as to match the center of the image 814 in the horizontal direction. For example, the term "match" means a shift length corresponding to an individual difference of the distance between the left and right eyes of the viewer. In another preferred manner, the frame of an image 818 in which both channels of the three-dimensional image are displayed with a decoration in the image 814.

In the display state, the display is switched to the display mode (two-dimensional display mode (3)) of the image 810 by the user operation of the viewer (pressing of the 3D/2D switching button 603) as indicated by an arrow 820.

Further, in the display state of an image 817, the image 818 is switched from one channel display (image 812) to both-channel display, and is displayed as a three-dimensional image. As similar to the above, an image 819 is switched from one channel display (image 811) to both-channel display, and is displayed as a three-dimensional image.

In addition, the three-dimensional image 818 and the three-dimensional image 819 are arranged and displayed so as to be aligned in the vertical direction (upper and lower direction) at the center of the image 817 in the horizontal direction. In a preferred manner, the center line of the three-dimensional image 818 in the stereoscopic view is arranged so as to match the center line of the three-dimensional image 819 in the stereoscopic view. For example, the term "match" means a shift length corresponding to an individual difference of the distance between the left and right eyes of the viewer. In another preferred manner, the frame of either the three-dimensional image 818 or 819 is displayed with a decoration in the image 817. This selection can be switched by the user operation of the viewer (pressing of the lower button of the cursor position moving buttons 605).

In the display state, the display is switched to the display mode (two-dimensional display mode (3)) of the image 810 by the user operation of the viewer (pressing of the 3D/2D switching button 603) as indicated by an arrow 821.

Further, in the display state of the image 814, the display is automatically switched to the preliminarily-set arrow direction after a predetermined time passes, or is switched to an image 823 (three-dimensional/two-dimensional display mode (5)) by the user operation of the viewer (pressing of the lower button of the cursor position moving buttons 605) as indicated by an arrow 822.

The display state is realized in such a manner that the size of the image 815 which hides behind the three-dimensional image 816 in which both channels of the three-dimensional image are displayed, cannot be viewed, and in which only one channel of the three-dimensional image is displayed is reduced to be displayed as an image 825, and the image 816 can be viewed as an image 824 without changing the arrangement of the image 816.

As a result, the whole image of the image 825 in which only one channel of the three-dimensional image is displayed can be viewed in addition to the image 824 in which both channels of the three-dimensional image are displayed.

In the display state, the display is switched to the display mode (two-dimensional display mode (3)) of the image 810 by the user operation of the viewer (pressing of the 3D/2D switching button 603) as indicated by an arrow 826.

Figure 9:
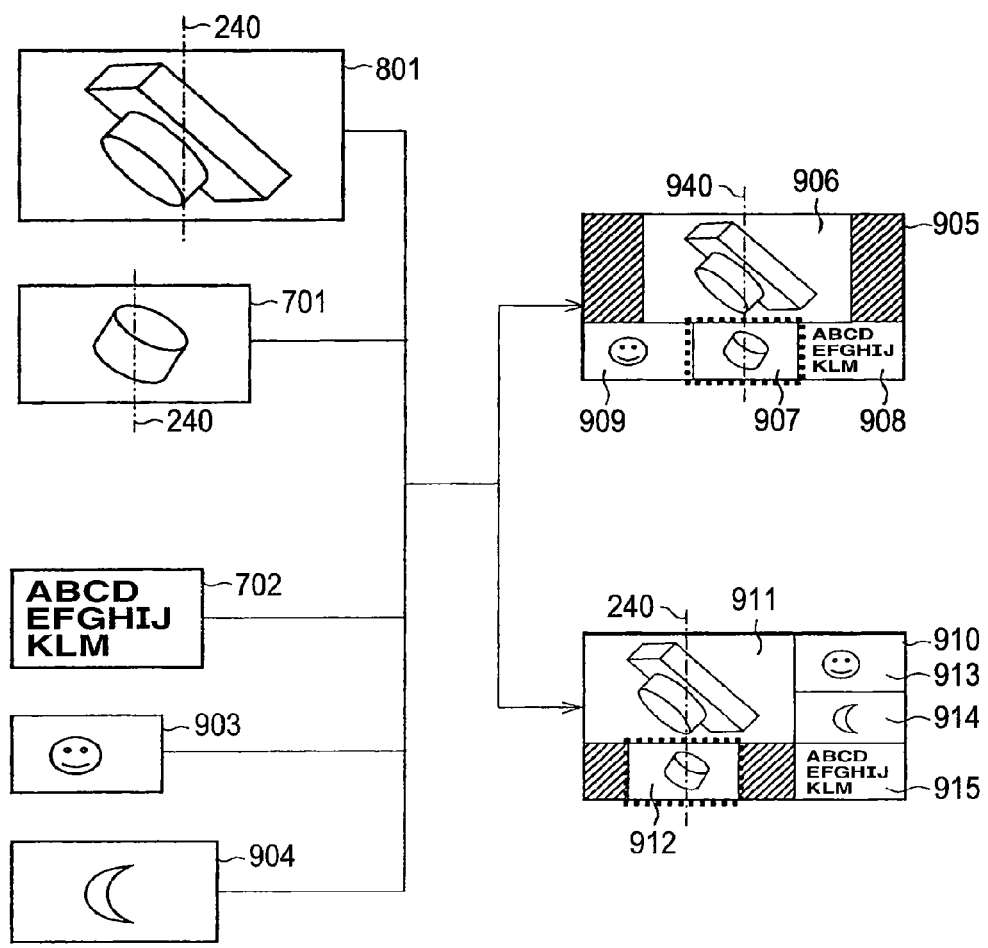
FIG. 9 is a diagram for explaining an embodiment of a switch display mode by the image processing apparatus of the present invention.

An embodiment of the operation of the image processing apparatus according to the present invention will be described using FIG. 9, FIG. 4, and FIG. 6. FIG. 9 shows screens displayed on the display device, and is a diagram for explaining the embodiment of a switch display mode by the image processing apparatus of the present invention. In the following description, the controlling unit 411 executes the processes unless otherwise specified.

In FIG. 9, the left column shows the types of video signal sources input to the image processing apparatus 410. Further, the right column shows the types of images (display modes) output from the image processing apparatus 410 to the display device 471.

The video signal sources include the images 801 and 701 as three-dimensional content (images), and images 702, 903 and 904 as two-dimensional content (images). The number and sizes of the two-dimensional and three-dimensional images are not limited to the embodiment shown in FIG. 9.

The image processing apparatus 410 of the present invention inputs therein the two-dimensional and three-dimensional images and outputs multi-images (for example, images 905 and 910), so that the two-dimensional and three-dimensional images selected from the input images can be displayed on the multi-screen of the display panel of the display device 471.

In the image 905, three-dimensional images 906 and 907 are displayed while being aligned in the vertical direction, so that each center line of the three-dimensional images 906 and 907 in the horizontal direction matches the display center line of the display panel of the display device 471 in the horizontal direction. For example, the term "match" means a shift length corresponding to an individual difference of the distance between the left and right eyes of the viewer.

At this time, two-dimensional images 908 and 909 are displayed in the same line as the three-dimensional image 907. It should be noted that when n pieces of three-dimensional images are displayed, the images may be displayed while being vertically aligned in n (n is a natural number equal to 3 or larger) lines. In this case, the two-dimensional images are arranged in plural lines.

According to the embodiment, all of three-dimensional images are displayed while being aligned with the center portion of the display device, so that every three-dimensional image can be comfortably viewed as a three-dimensional image. Further, even if only one image is a three-dimensional image, the three-dimensional image is displayed while being aligned with the center of the display device, so that the three-dimensional image can be comfortably viewed as a three-dimensional image.

In the image 910, three-dimensional images 911 and 912 are displayed while being aligned in the vertical direction, so that the center lines 240 of the three-dimensional images 911 and 912 in the stereoscopic view match each other in the display panel of the display device 471. For example, the term "match" means a shift length corresponding to an individual difference of the distance between the left and right eyes of the viewer.

At this time, two-dimensional images 913, 914, and 915 are displayed while being vertically aligned in a line adjacent to the three-dimensional images 911 and 912. It should be noted that when n pieces of three-dimensional images are displayed, the images may be displayed while being vertically aligned in n (n is a natural number equal to 3 or larger) lines. Further, the two-dimensional images may be arranged in plural lines.

According to the embodiment, all of three-dimensional images are aligned with the center lines 240 in the stereoscopic view are allowed to match each other, so that every three-dimensional image can be comfortably viewed as a three-dimensional image. Further, even if only one image is a three-dimensional image, the three-dimensional image is displayed while being aligned with the center line in the stereoscopic view, so that the three-dimensional image can be comfortably viewed as a three-dimensional image.

Figure 10:
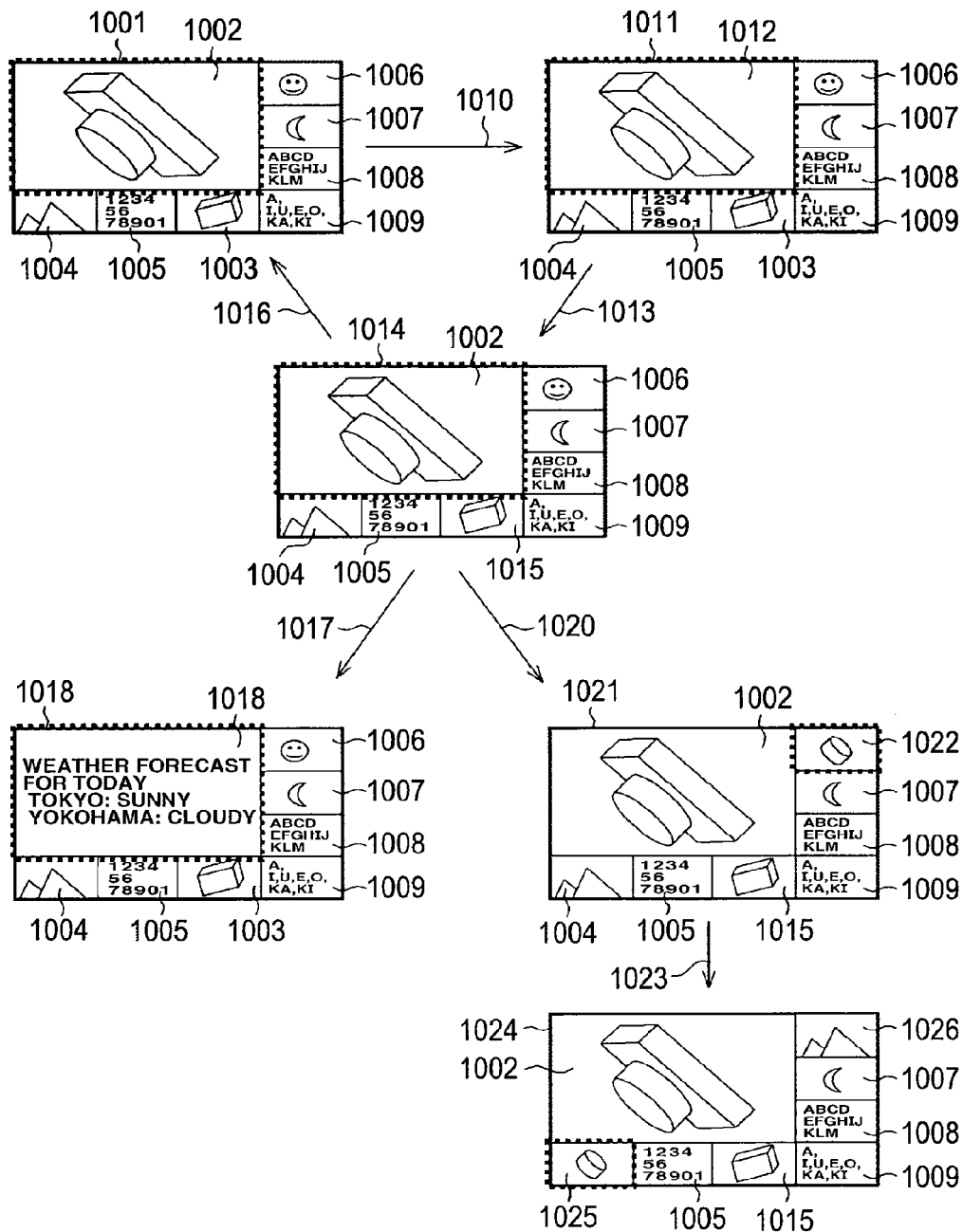
FIG. 10 is a diagram for explaining an embodiment of a switch display mode by the image processing apparatus of the present invention.

An embodiment of the operation of the image processing apparatus according to the present invention will be described using FIG. 10, FIG. 4, and FIG. 6. FIG. 10 shows screens displayed on the display device, and is a diagram for explaining the embodiment of a switch display mode by the image processing apparatus of the present invention. In the following description, the controlling unit 411 executes the processes unless otherwise specified.

In FIG. 10, a multi-image 1001 is displayed on the screen of the display device 471. In the multi-image 1001, a three-dimensional image 1002 is displayed as a main screen, and a three-dimensional image 1003 and two-dimensional images 1003 to 1009 are arranged as sub-screens around the three-dimensional image 1002. However, because only one channel is displayed in the image 1003, the image 1003 is displayed as a two-dimensional image.

Further, the frame of the image 1002 is displayed with a decoration.

If the 3D/2D switching button 603 is pressed in the display state, the display is switched to an image 1011 as indicated by an arrow 1010.

In the image 1011, the image 1002 displayed as a three-dimensional image is displayed as a two-dimensional image 1012, and the frame thereof is displayed with a decoration.

As a result, since all of the images are displayed as two-dimensional images, three-dimensional images and two-dimensional images are not mixed, and thus eyestrain of the viewer can be suppressed.

Next, if the 3D/2D switching button 603 is pressed in the display state, the display is switched to an image 1014 as indicated by an arrow 1013.

In the image 1014, the image 1012 is displayed as only one channel of the three-dimensional image. For this, the image 1012 displayed as two-dimensional image is displayed as the three-dimensional image 1002 in which both channels are displayed, and the frame thereof is displayed with a decoration. At the same time, the image 1003 of the sub-screens which is originally a three-dimensional image but is displayed as a two-dimensional image is displayed as a three-dimensional image 1015.

As a result, all of the content (images) which are originally input as three-dimensional images is displayed as three-dimensional images.

If the 3D/2D switching button 603 is pressed in the display state, the display is switched to the image 1001 as indicated by an arrow 1016.

As described above, whenever 3D/2D switch button 603 is pressed by operation of the user, the following three modes are sequentially switched to each other by the operation. One of the three modes is the three-dimensional one-channel display (two-dimensional display mode (1)), one is the three-dimensional both-channel display(three-dimensional/two-dimensional display mode (6)), and one is the three-dimensional both-channel display only for the main screen and the two-dimensional one-channel display for the three-dimensional images of the other screens (sub-screens) (three-dimensional/two-dimensional display mode (7)).

If the channel switching button is pressed by the operation of the user in the display state of the image 1014 (the image 1002 of the main screen is displayed with a decoration), the channel of the main screen is switched as shown in an image 1008 indicated by an arrow 1017. If the image of the switched channel is a two-dimensional image, the image of the main screen is two-dimensionally displayed, and the three-dimensional image displayed on the sub-screen is switched to an image in which one channel of the three-dimensional image is displayed, and is displayed as the two-dimensional image 1003.

Specifically, display of the images of the sub-screens is switched in accordance with the type (three-dimensional image or two-dimensional image) of content (image) of the largest screen (main screen). In a preferred manner, the type of the image is switched depending on the type of a video source input to the image processing apparatus. In another preferred manner, the type of the image may be switched in accordance with the user-operable screen (the channel switching button 608 and the VOL button 609).

As a result, since all of the images are displayed as two-dimensional images same as that of the main screen, three-dimensional images and two-dimensional images are not mixed, and thus eyestrain of the viewer can be suppressed.

In a more preferred manner, indication of two-dimensional display may be displayed on the screen. As a result, the viewer with 3D glasses on can recognize that the display screen does not display a three-dimensional image, and it is not necessary to wear 3D glasses.

Next, it is assumed that when the cursor position moving buttons 605 are pressed by the operation of the user in the display state of the image 1014, the image displayed with a decoration as in an image 1021 indicated by an arrow 1020 is switched to an image 1022 of the sub-screen. Further, if the channel switching button is pressed by the operation of the user in this case, the channel of the sub-screen is switched as shown in the image 1021 indicated by the arrow 1020. If the image of the switched channel is a three-dimensional image, the three-dimensional image 1022 displayed on the sub-screen is displayed as a three-dimensional image 1025 while being moved under (or above) the image 1002 of the main screen as shown in an image 1024 indicated by an arrow 1023. In a preferred manner, the image 1022 is moved to a position not adjacent to the three-dimensional image 1015. In a more preferred manner, the image is arranged at a position where the center line of the three-dimensional image 1002 of the main screen in the stereoscopic view is not apart from those of the three-dimensional images 1025 and 1015 of the sub-screens in the stereoscopic view.

As a result, all of the three-dimensional images are displayed while being vertically aligned with the image of the main screen, so that the three-dimensional images can be comfortably viewed and eyestrain of the viewer can be suppressed.

Another embodiment of the present invention will be described using FIG. 11 to FIG. 14. FIG. 11 to FIG. 14 are diagrams each explaining that if the cursor is placed on one of the two-dimensional images shown in FIG. 7 to FIG. 10 (for example, the image 708 of FIG. 7), the two-dimensional image is displayed as a three-dimensional image, so that the viewer can easily recognize that the cursor is placed.

Further, the direction of the arrow of the Y-direction in each of FIG. 11 to FIG. 14 is shown opposite to that in FIG. 2.

Figure 11:
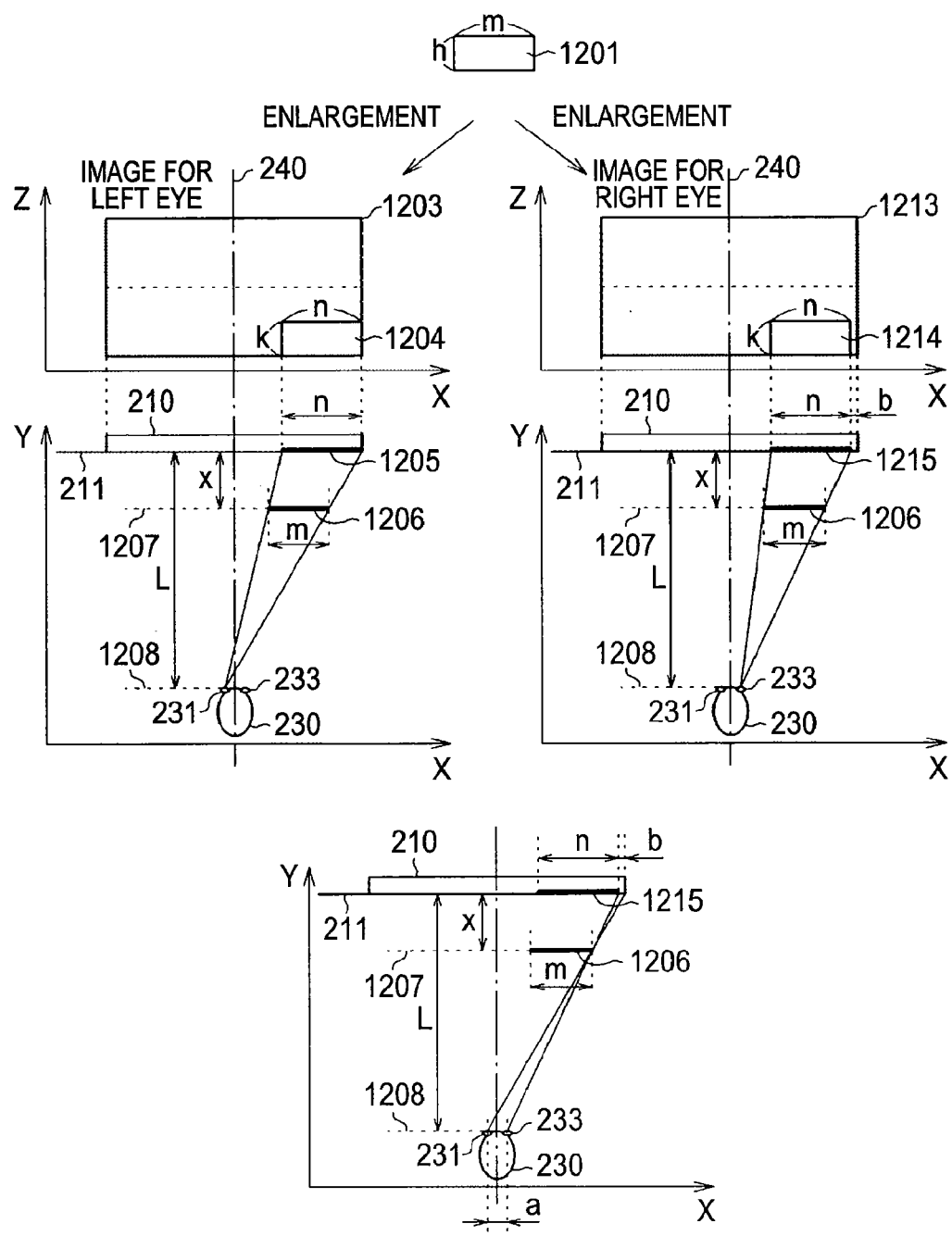
FIG. 11 is a diagram for explaining an embodiment of correction of an image display position according to the present invention.

Another embodiment of the present invention will be described using FIG. 11. FIG. 11 is a diagram for explaining an embodiment in the case where position correction is performed for all images displayed on a display panel screen 211. Further, FIG. 11 shows an embodiment in the case where two-dimensional content (image 1201) is enlarged and arranged on the display panel screen 211. Further, FIG. 11 shows a case in which a disparity is provided for two-dimensional content to be displayed as a three-dimensional image, and an image-forming position is provided between the display panel screen 211 and a user 230. It should be noted that correction of a video display position in the left direction can be performed on the assumption that the display panel screen 211 and the eyes are symmetric. The image 1201 of FIG. 11 is a diagram showing two-dimensional content. The X-Z plane and the X-Y plane on the left side of FIG. 11 are diagrams for explaining correction of the image for the left eye, and the X-Z plane and the X-Y plane on the right side of FIG. 11 are diagrams for explaining correction of the image for the right eye. The X-Y plane on the lower side of FIG. 11 is a diagram for explaining a relation among a shift length b between the image for the right eye and the image for the left eye, a viewing distance L from the user 230, and a pop-up length X from the display device.

FIG. 11 shows a case in which the content (the image 1201: horizontal width m and height h) is enlarged and displayed on the display panel screen 211 of the display device 210 (an image 1204 or an image 1214: horizontal width n and height k).

The content with the size (horizontal width: m (pixels) and height h (pixels)) shown as the image 1201 of FIG. 11 is arranged in each of an image 1203 of the image for the left eye and an image 1213 of the image for the right eye.

If the image 1201 is arranged on the lower right side of the image 1203 in the image for the left eye of FIG. 11, the image 1201 is output for display with a size of the horizontal width n and the height k to the display panel screen 211

(image 1204). In addition, if the image 1201 is arranged on the lower right side of the image 1213 in the image for the right eye of FIG. 11, the image 1201 is output for display with a size of the horizontal width n and the height k to the display panel screen 211 (image 1214). It should be noted that the image 1214 is shifted inward by the width b from the right end of the display panel screen 211 to produce a three-dimensional image. At this time, an imaged image 1206 with the horizontal width m is present on an image-forming plane 1207.

In the image for the left eye of FIG. 11 and the image for the right eye of FIG. 11, a distance (pop-up length) from the display panel screen 211 to the image-forming plane 1207 is represented by X and a distance (a distance from the display panel screen 211 to a viewing position 1208: viewing distance) from the display panel screen 211 to the left eye 231 and the right eye 233 of the user 230 is represented by L.

The X-Y plane on the lower side of FIG. 11 is a diagram for explaining general formulae of correction in the case where pop-up control is performed for all images arranged on the display panel screen 211.

On the assumption that the horizontal width of the image 1201 is represented by m, the horizontal width of the image for the right eye 1215 on the display panel screen 211 in which the image 1201 is reflected is represented by n, the horizontal width of the image 1206 on the image-forming plane 1207 is represented by m, a distance (viewing distance) from the display panel screen 211 to the left eye 231 and the right eye 233 of the user 230 is represented by L, a distance (pop-up length) from the display panel screen 211 to the image-forming plane 1207 is represented by X, and a distance between the left eye 231 and the right eye 233 is represented by a, the following formulae (1) to (4) can be obtained from the relation of the similarity diagrams.

$$L:(L-X)=n:m \qquad \text{Formula (1)}$$

$$n=m \times L \div (L-X)=m \times (1+b \div a) \qquad \text{Formula (2)}$$

$$m=n \times (L-X) \div L=n \times (1-b \div (a+b)) \qquad \text{Formula (3)}$$

$$k=h \times n \div m \qquad \text{Formula (4)}$$

As described above, if the viewing distance L and the pop-up distance X are determined, the shift length b can be calculated and an enlargement ratio m:n for the display device can be set. Further, if the viewing position 1208 of the user 230 is changed, only the pop-up length is changed as long as the shift length b is determined, and thus no problem occurs.

Figure 12:
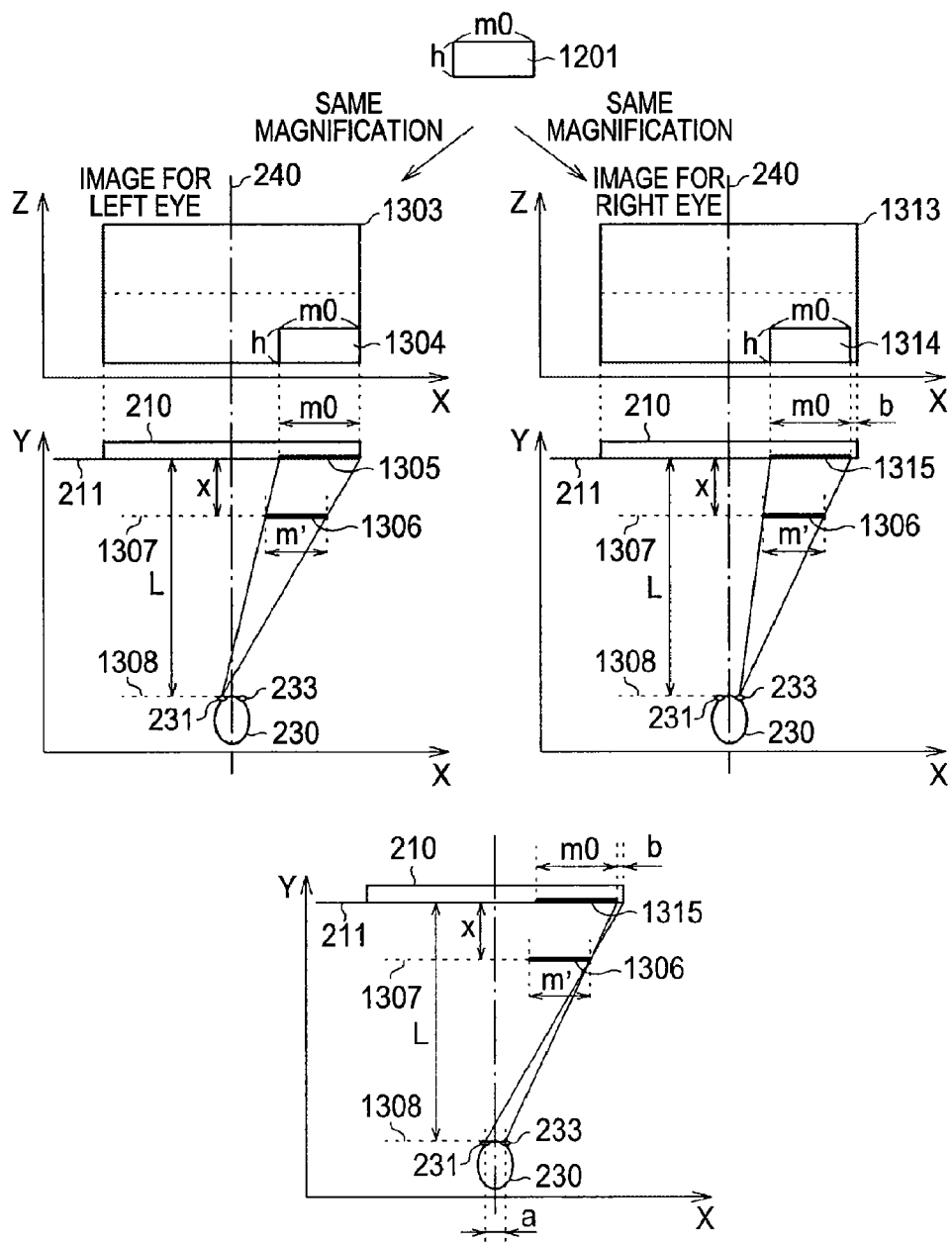
FIG. 12 is a diagram for explaining an embodiment of correction of an image display position according to the present invention.

Another embodiment of the present invention will be described using FIG. 12. FIG. 12 is a diagram for explaining the embodiment of the present invention in the case where the positions of all images displayed at the same magnitude on the display panel screen 211 are corrected, whereas the content (image 1201) is enlarged and arranged on the display panel screen 211 in FIG. 11. Further, the matters same as those in FIG. 11 will not be explained. The image 1201 of FIG. 12 is a diagram showing two-dimensional content. The X-Z plane and the X-Y plane on the left side of FIG. 12 are diagrams for explaining correction of the image for the left eye, and the X-Z plane and the X-Y plane on the right side of FIG. 12 are diagrams for explaining correction of the image for the right eye. The X-Y plane on the lower side of FIG. 12 is a diagram for explaining a relation among the shift length b between the image for the right eye and the image for the left eye, the viewing distance L from the user 230, and the pop-up length X from the display device.

FIG. 12 shows a case in which the content (image 1201: horizontal width m0 and height h) is displayed at the same magnitude on the display panel screen 211 of the display device 210 (an image 1304 or an image 1314: horizontal width m0 and height h).

The content with the size (horizontal width: m0 (pixels) and height h (pixels)) shown as the image 1201 of FIG. 12 is arranged in each of an image 1303 of the image for the left eye and an image 1313 of the image for the right eye in FIG. 12.

If the image 1201 is arranged on the lower right side of the image 1303 in the image for the left eye of FIG. 12 (image 1304), the image 1201 is output for display with a size of the horizontal width m0 and the height h to the display panel screen 211 (image 1305). In addition, if the image 1201 is arranged on the lower right side of the image 1313 in the image for the right eye of FIG. 12 (image 1314), the image 1201 is output for display with a size of the horizontal width m0 and the height h to the display panel screen 211 (image 1315). It should be noted that the image 1314 is shifted inward by the width b from the right end of the display panel screen 211 to produce a three-dimensional image. At this time, an imaged image 1306 with a horizontal width m' is present on an image-forming plane 1307.

In the image for the left eye of FIG. 12 and the image for the right eye of FIG. 12, a distance (pop-up length) from the display panel screen 211 to the image-forming plane 1307 is represented by X and a distance from the display panel screen 211 to the left eye 231 and the right eye 233 of the user 230 is represented by L.

The X-Y plane on the lower side of FIG. 12 is a diagram for explaining general formulae of correction in the case where pop-up control is performed for all images arranged on the display panel screen 211.

On the assumption that the horizontal width of the image 1201 is represented by m0, the horizontal width of the image for the right eye 1315 on the display panel screen 211 in which the image 1201 is reflected is represented by m0, the horizontal width of the image 1306 on the image-forming plane 1307 is represented by m', a distance (viewing distance) from the display panel screen 211 to the left eye 231 and the right eye 233 of the user 230 is represented by L, and a distance (pop-up length) from the display panel screen 211 to the image-forming plane 1207 is represented by X, the following formulae (5) to (8) can be obtained from the relation of the similarity diagrams in the embodiment of FIG. 12 in which the image is displayed at the same magnitude.

$$L:(L-X)=m0:m' \qquad \text{Formula (5)}$$

$$m0=m' \times L \div (L-X)=m' \times (1+b \div a) \qquad \text{Formula (6)}$$

$$m'=m0 \times (L-X) \div L=m0 \times (1-b \div (a+b)) \qquad \text{Formula (7)}$$

$$k=h \times m0 \div m' \qquad \text{Formula (8)}$$

As described above, if the viewing distance L and the pop-up distance X are determined, the shift length b can be calculated and an enlargement ratio m':n for the display device can be set. As a result, an image processing apparatus in which the number of operations is reduced can be realized by providing a small disparity without resizing the image 1201.

Figure 13:
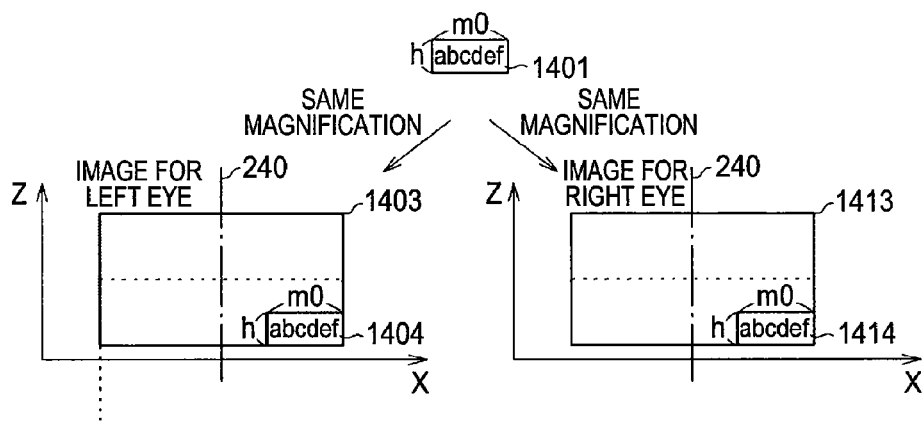
FIG. 13 is a diagram for explaining an embodiment of correction of an image display position according to the present invention.

Another embodiment of the present invention will be described using FIG. 13. FIG. 13 is a diagram for explaining handling of displayed two-dimensional images in the case where the positions of all images on the display panel screen of the display device are corrected as three-dimensional images by the image processing apparatus of the present invention, as described in FIG. 11. Specifically, FIG. 13 is a diagram for explaining the embodiment in which if all images output to the display device 210 are displayed in the three-dimensional display mode, two-dimensional images are corrected. An image 1401 of FIG. 13 is a diagram showing two-dimensional content. The X-Z plane on the left side of FIG. 13 is a diagram for explaining correction of the image for the left eye, and the X-Z plane on the right side of FIG. 13 is a diagram for explaining correction of the image for the right eye.

FIG. 13 is a diagram for explaining the embodiment in the case where the two-dimensional content (image 1401), specifically, the two-dimensional content in which characters are displayed is displayed at the same magnitude. Further, the matters same as those in FIG. 11 and FIG. 12 will not be explained.

In FIG. 13, the content (image 1401: horizontal width m0 and height h) is displayed at the same magnitude on the display panel screen 211 of the display device 210 (an image 1404 or an image 1414: horizontal width m0 and height h).

The content with the size (horizontal width: m0 (pixels) and height h (pixels)) shown as the image 1401 of FIG. 13 is arranged in each of an image 1403 of the image for the left eye and an image 1413 of the image for the right eye.

If the image 1401 is arranged on the lower right side of the image 1403 in the image for the left eye of FIG. 13, the image 1401 is output for display with a size of the horizontal width m0 and the height h to the display panel screen 211 (image 1404).

At this time, the two-dimensional image 1404 displayed in the image for the left eye 1403 is shifted from the two-dimensional image 1414 displayed in the image for the right eye 1413 by the shift length b (or the shift length b of FIG. 12) calculated in the image for the right eye of FIG. 11. Therefore, it is difficult to view small-sized characters and symbols in the character display in the two-dimensional image due to provision of the disparity. Especially, characters and symbols displayed in one dot to a few dots are not correctly displayed.

In the embodiment of FIG. 13, displayed characters are displayed in a bold font or enlarged by one level.

As a result, characters can be clearly viewed and recognized even in a two-dimensional image which is three-dimensionally displayed.

Even in the case where the position correction of the present invention as described in FIG. 11 to FIG. 12 is not performed, if a user views a multi-screen in which three-dimensional images and two-dimensional images are mixed, characters and symbols in the two-dimensional images or the three-dimensional images can be clearly viewed and recognized from the viewpoint of viewing the three-dimensional images.

Figure 14:
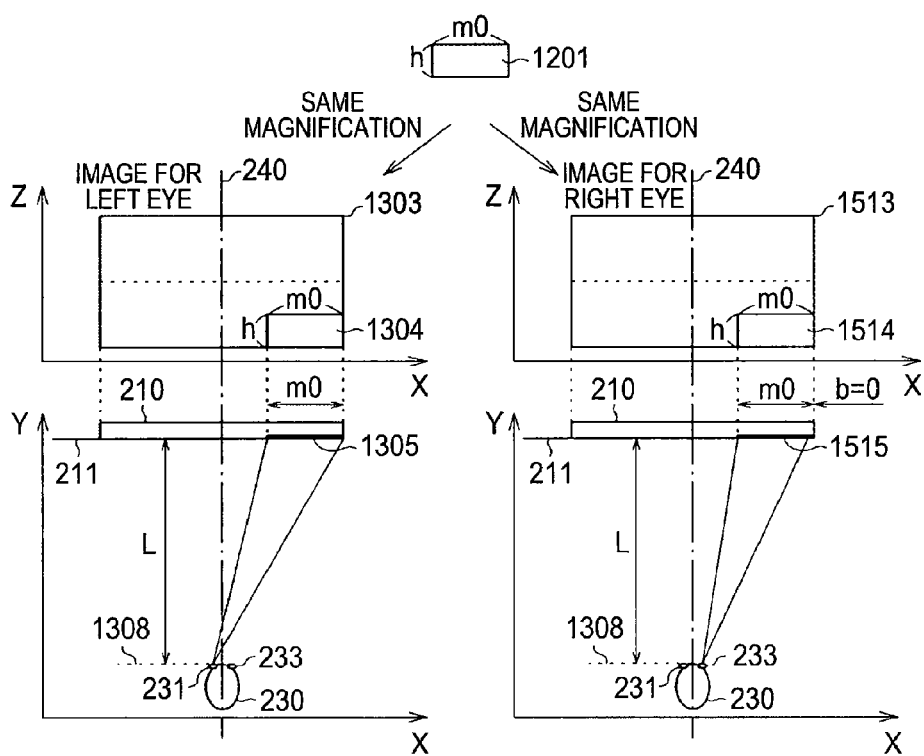
FIG. 14 is a diagram for explaining an embodiment of correction of an image display position according to the present invention.

Another embodiment of the present invention will be described using FIG. 14. FIG. 14 is a diagram for explaining the embodiment in which a three-dimensional image is displayed on the display panel screen of the display device by the image processing apparatus of the present invention. Specifically, FIG. 14 is a diagram for explaining the embodiment in the case where a three-dimensional image output to the display device 210 for display is three-dimensionally displayed. The image 1201 of FIG. 14 is a diagram showing three-dimensional content. The X-Z plane and the X-Y plane on the left side of FIG. 14 are diagrams for explaining correction of the image for the left eye, and the X-Z plane and the X-Y plane on the right side of FIG. 14 are diagrams for explaining correction for the image for the right eye.

In FIG. 14, the three-dimensional image 1201 with a size of m0 in the horizontal direction and a size of h in the height direction is output so as to be arranged at the same magnitude in the image 1303 of the image for the left eye by the image processing apparatus. As similar thereto, the image 1201 is output so as to be arranged at the same magnitude in an image 1513 of the image for the right eye.

The image for the left eye of FIG. 14 is the same as that of FIG. 12. Thus, the explanation thereof will not be repeated. If the three-dimensional image 1201 is output to be arranged in the image 1513 as an image 1514 of the image for the right eye, the three-dimensional image 1201 is arranged as the image 1514 at the position same as the image 1304 in the image 1303 of the image for the left eye, and the image for the right eye of FIG. 14 is output to the display device.

According to the embodiment of FIG. 14, the input three-dimensional image is displayed at the same magnitude and embedded into the same position. Specifically, the image (for example, the image of the image for the left eye) 503 of an odd-numbered frame and the image (for example, the image of the image for the right eye) 504 of an even-numbered frame as described in FIG. 5 are preferably output as the same image. As a result, the number of operations can be reduced and the control can be simplified.

Further, stereoscopic images are displayed by providing a disparity between the left and right eyes, so that the viewer can recognize the images as three-dimensional images in the present invention. However, although the viewer focuses his/her eyes on the display device, the viewer recognizes as if objects of the stereoscopic images are present in the depth direction different from the position of the display device. Accordingly, the viewer feels a feeling of strangeness, and the resolution of the display device itself cannot be obtained. In the embodiment of FIG. 14, the image is output to the display device as if the image is present at the position of the display device in the image processing apparatus according to embodiment of the present invention as described above. As a result, it is possible to obtain the proper resolution of the display device. The image 712 of FIG. 7 on which the cursor is not placed is displayed as shown in FIG. 14, and the image 708 of FIG. 7 on which the cursor is placed is displayed as shown in FIG. 11. Accordingly, the image 712 is popped as the image 708, and the user can easily determine whether or not the cursor is placed on the image. At this time, pop-up animation may be displayed by gradually increasing the shift length b shown in FIG. 11 from 0 and by gradually decreasing the shift length b when the shift length b reaches a constant value.

Figure 15:
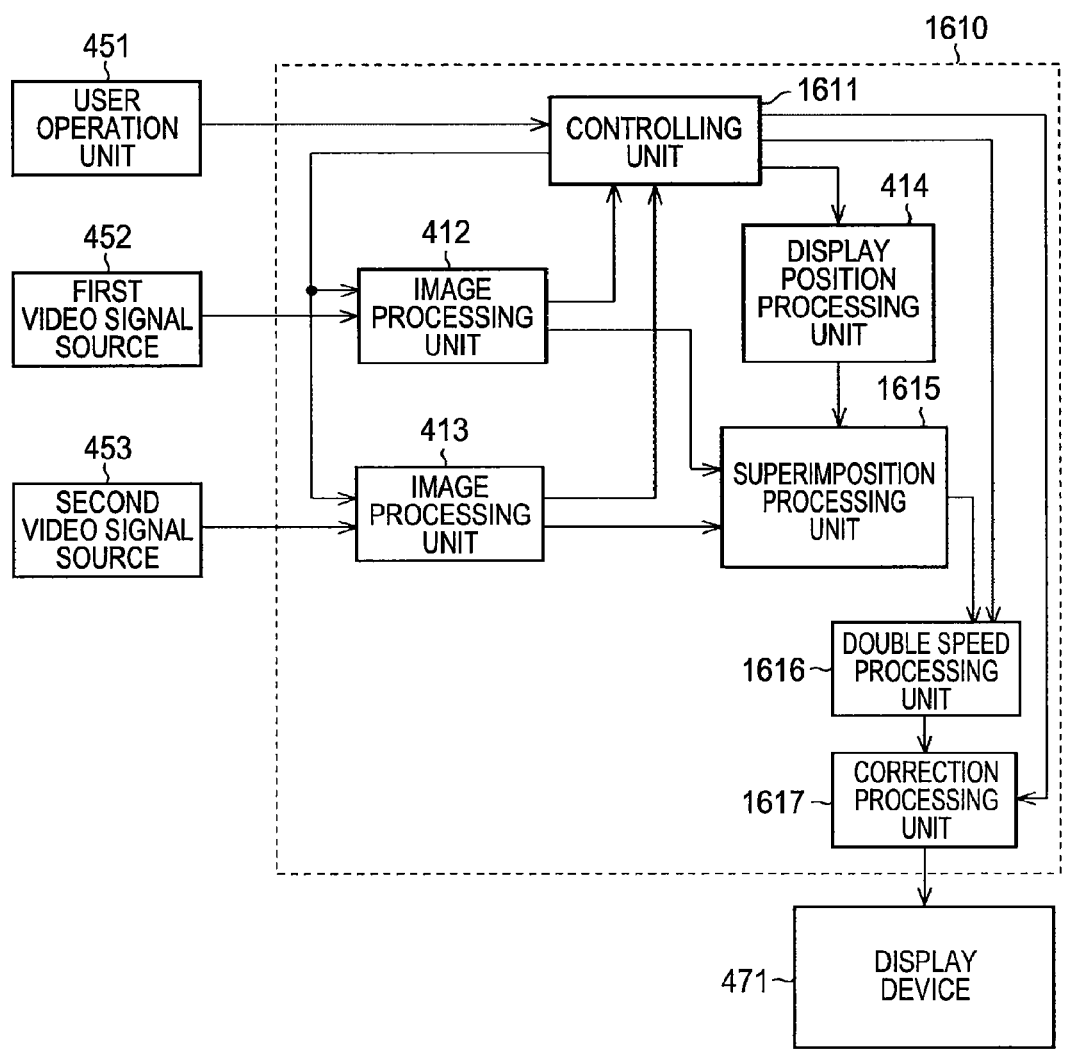
FIG. 15 is a block diagram for showing a configuration of an embodiment of an image processing apparatus according to the present invention.

A configuration of another embodiment of the image processing apparatus of the present invention will be described using FIG. 15. FIG. 15 is a block diagram for showing a configuration of the embodiment of the image processing apparatus according to the present invention. In the configuration of an image processing apparatus 1610 of FIG. 15, a superimposition processing unit 1615 is used in place of the superimposition processing unit 415, and a double speed processing unit 1616 and a correction processing unit 1617 are provided at the stage after the superimposition processing unit 1615, unlike the configuration of FIG. 4. Further, a controlling unit 1611 is different from the controlling unit 411 in the configuration of the control processing unit of the FPGA unit or a software program in the CPU.

In FIG. 15, the controlling unit 1611 mutually accesses the respective units of the image processing apparatus 1610 in accordance with a software program that is a preliminarily stored as a processing operation of the image processing apparatus 1610 under the control of the user operation unit 451, and controls the respective units of the image processing apparatus 1610.

The videos input to the image processing units 412 and 413 are input to the superimposition processing unit 1615. The superimposition processing unit superimposes the video signals input through the image processing unit 412 and through the image processing unit 413 on the basis of the information of the display positions input from the display position processing unit 414, and outputs the resultant to the double speed processing unit 1616.

The double speed processing unit 1616 outputs the image of the image for the left eye and the image of the image for the right eye input from the superimposition processing unit 1615 to the correction processing unit 1617 at the double speed. Alternatively, the double speed processing unit 1616 outputs the image of the image for the left eye and the image of the image for the right eye input from the superimposition processing unit 1615 to the correction processing unit 1617 at, for example, the quad speed while inserting a black image between two pieces of video data.

The correction processing unit 1617 performs at least one of the corrections described in FIG. 7 to FIG. 14, and outputs to the display device 471 for display.

As a result, it is possible to provide the image processing apparatus in which images that can be comfortably viewed by the user with less eyestrain can be displayed on the display device.

It should be noted that the switching of display described in FIG. 7 to FIG. 10 can be performed by the superimposition processing unit 1615 in accordance with the control of the controlling unit 1611.

The present invention has been described above in detail using the embodiments. However, it is obvious that the present invention is not limited to the above-described embodiments, and includes other aspects of the invention which can be obtained by amending or changing the present invention by those skilled in the art in the field of the present invention on the basis of the idea and spirit of the present invention.

What is claimed is:

1. An image processing apparatus comprising:
   an image processing unit which inputs video signals including both a three-dimensional video content and a two-dimensional video content from a plurality of video signal sources to be output as images after a predetermined process is performed;
   a display position processing unit which outputs display position information for simultaneously displaying the input video signals on a screen;
   a multi-screen processing unit which performs a multi-screen process to display the respective images input from the image processing unit on a display panel screen of a display device on the basis of the display position information;
   a 3D/2D converting unit which converts an image of a three-dimensional video content into an image of a two-dimensional video content, or converts an image of a two-dimensional video content into an image of a three-dimensional video content, and
   a controlling unit which controls the image processing unit, the display position processing unit, the 3D/2D converting unit and the multi-screen processing unit, wherein when the three-dimensional video content and the two-dimensional video content are displayed at the same time on the screen, the controlling unit controls the display panel screen of the display device to display, as a three-dimensional image, the three-dimensional video content on a first area of the display panel screen, and the two-dimensional video content, an image of which is converted to a three-dimensional video by the 3D/2D converting unit, on a second area of the display panel screen; and
   wherein a center line of a stereoscopic view for the first area of the display panel screen matches that for the second area of the display panel screen.

2. The image processing apparatus according to claim 1, wherein based on an instruction, the controlling unit controls the display panel screen of the display device to display,
   as a three-dimensional image, the three-dimensional video content on the first area of the display panel screen, and
   as a two dimensional image, the two-dimensional video content on the second area of the display panel screen.

3. An image processing apparatus comprising:
   an image processing unit which inputs video signals including both a three-dimensional video content and a two-dimensional video content from a plurality of video signal sources to be output as images after a predetermined process is performed;
   a display position processing unit which outputs display position information for simultaneously displaying the input video signals on a screen;
   a multi-screen processing unit which performs a multi-screen process to display the respective images input from the image processing unit on a display panel screen of a display device on the basis of the display position information;
   a 3D/2D converting unit which converts an image of a three-dimensional video content into an image of a two-dimensional video content, or converts an image of a two-dimensional video content into an image of a three-dimensional video content; and
   a controlling unit which controls the image processing unit, the display position processing unit, the 3D/2D converting unit and the multi-screen processing unit,
   wherein when the three-dimensional video content and the two-dimensional video content are displayed at the same time on the screen, the controlling unit controls the display panel screen of the display device in accordance with one of display modes including:
      a first display mode for displaying, as a two-dimensional image, the three-dimensional video content, an image of which is converted to a two-dimensional image by the 3D/2D converting unit, on a first area of the display panel screen, and the two-dimensional video content on a second area of the display panel screen, and
      a second display mode for displaying, as a three-dimensional image, the three-dimensional video content on the first area of the display panel screen, and the two-dimensional video content, an image of which is converted to a three-dimensional video by the 3D/2D converting unit, on the second area of the display panel screen; and
   wherein a center line of a stereoscopic view for the first area of the display panel screen matches that for the second area of the display panel screen.

4. The image processing apparatus according to claim 3, wherein the display modes further includes a third mode for displaying:
- as a three-dimensional image, the three-dimensional video content on the first area of the display panel screen, and
- as a two dimensional image, the two-dimensional video content on the second area of the display panel screen.

* * * * *